United States Patent
Bereczkné et al.

(10) Patent No.: US 10,641,418 B2
(45) Date of Patent: May 5, 2020

(54) CHEMICAL AND GAS-RESISTANT, HIGH-PRESSURE, LARGE-BORE BONDED FLEXIBLE RUBBER PIPE AND METHOD FOR PRODUCING THE SAME

(71) Applicants: Urbán Mónika Bereczkné, Pitvaros (HU); Györgyi Szöllösi, Szeged (HU); Tibor Nagy, Budapest (HU); István Grépály, Budapest (HU); Zalán Kádár, Szeged (HU); Lajos Kis, Makó (HU)

(72) Inventors: Urbán Mónika Bereczkné, Pitvaros (HU); Györgyi Szöllösi, Szeged (HU); Tibor Nagy, Budapest (HU); Tamás Katona, Algyö (HU); István Grépály, Budapest (HU); Zalán Kádár, Szeged (HU); Lajos Kis, Makó (HU)

(73) Assignee: ContiTech Rubber Industrial Kft., Szeged (HU)

( * ) Notice: Subject to any disclaimer, the term of this patent is extended or adjusted under 35 U.S.C. 154(b) by 0 days.

(21) Appl. No.: 16/388,432

(22) Filed: Apr. 18, 2019

(65) Prior Publication Data

US 2019/0242501 A1    Aug. 8, 2019

Related U.S. Application Data

(63) Continuation of application No. 15/297,629, filed on Oct. 19, 2016, now abandoned.

(30) Foreign Application Priority Data

Oct. 21, 2015    (HU) ..................................... 1500493

(51) Int. Cl.
*F16L 11/04*    (2006.01)
*B32B 1/00*    (2006.01)
(Continued)

(52) U.S. Cl.
CPC ............... *F16L 11/04* (2013.01); *B32B 1/00* (2013.01); *B32B 1/08* (2013.01); *B32B 5/02* (2013.01);
(Continued)

(58) Field of Classification Search
CPC . C08F 214/22; B32B 1/00; B32B 5/02; B32B 7/04; B32B 25/04; B32B 25/042;
(Continued)

(56) References Cited

U.S. PATENT DOCUMENTS 5,679,425 A ‡ 10/1997 Plumley .................... B32B 1/08
    428/35
5,876,624 A ‡ 3/1999 Novits ................. C08K 5/0025
    252/18

(Continued)

FOREIGN PATENT DOCUMENTS

EP    0759354 A1 ‡ 2/1997 ............. B32B 25/14
EP    1048453 A2 ‡ 11/2000 ............... B32B 1/08
GB    2329439 A ‡ 3/1999 ............. F16L 11/08

OTHER PUBLICATIONS

Klaus Hintzer, Tilman Zipplies, D. Peter Carlson, Walter Schmiegel, "Ullmann's Polymers and Plastics: Products and Processes", 4 Volume Set, Mar. 18, 2016, Wiley-VCH, p. 641, vol. 2.‡

(Continued)

*Primary Examiner* — Craig M Schneider
*Assistant Examiner* — David R Deal
(74) *Attorney, Agent, or Firm* — Kaplan Breyer Schwarz, LLP

(57) ABSTRACT

A high-pressure, large-bore bonded flexible rubber pipe resistant to aggressive chemicals and gases, particularly for conveying gas or oil, the flexible pipe having a liner made of poly(vinylidene-fluoride) homopolymer or copolymer wherein a hydrogenated nitrile rubber-based, peroxide-vul-
(Continued)

canized rubber compound 2 is bonded to the poly(vinylidene-fluoride) liner, which has a Mooney 05, 150° C. scorch time of at least 10 minutes. Further, a method for manufacturing such hoses, the method including vulcanization performed at a temperature of at least 160° C.

9 Claims, 4 Drawing Sheets

(51) Int. Cl.
*B32B 5/02* (2006.01)
*B32B 7/04* (2019.01)
*B32B 15/02* (2006.01)
*B32B 15/06* (2006.01)
*B32B 15/082* (2006.01)
*B32B 25/04* (2006.01)
*B32B 25/08* (2006.01)
*B32B 25/10* (2006.01)
*B32B 25/16* (2006.01)
*B32B 27/22* (2006.01)
*B32B 27/30* (2006.01)
*B32B 1/08* (2006.01)
*C08F 136/06* (2006.01)
*C08F 214/22* (2006.01)
*C08J 3/24* (2006.01)
*F16L 11/08* (2006.01)

(52) U.S. Cl.
CPC ............... *B32B 7/04* (2013.01); *B32B 15/02* (2013.01); *B32B 15/06* (2013.01); *B32B 15/082* (2013.01); *B32B 25/04* (2013.01); *B32B 25/042* (2013.01); *B32B 25/08* (2013.01); *B32B 25/10* (2013.01); *B32B 25/16* (2013.01); *B32B 27/22* (2013.01); *B32B 27/304* (2013.01); *C08F 136/06* (2013.01); *C08F 214/22* (2013.01); *C08J 3/247* (2013.01); *B32B 2250/05* (2013.01); *B32B 2260/023* (2013.01); *B32B 2260/048* (2013.01); *B32B 2262/0269* (2013.01); *B32B 2262/0276* (2013.01); *B32B 2307/50* (2013.01); *B32B 2307/546* (2013.01); *B32B 2307/704* (2013.01); *B32B 2307/714* (2013.01); *B32B 2307/732* (2013.01); *B32B 2597/00* (2013.01); *C08J 2327/16* (2013.01); *C08J 2409/02* (2013.01); *F16L 11/088* (2013.01)

(58) Field of Classification Search
CPC ......... B32B 25/08; B32B 25/10; B32B 25/16; B32B 27/22; B32B 27/304; B32B 2250/05; B32B 2260/048; B32B 2607/50; B32B 2607/546; B32B 2607/704; B32B 2607/714; B32B 2607/7323; B32B 2597/00; C08J 3/247; C08J 2327/16; C08J 2409/02
USPC ....................................... 138/137
See application file for complete search history.

(56) References Cited

U.S. PATENT DOCUMENTS

| | | | |
|---|---|---|---|
| 2002/0106470 A1‡ | 8/2002 | Merziger | B32B 1/08 428/36.91 |
| 2008/0041484 A1‡ | 2/2008 | Haines | B32B 1/08 138/126 |
| 2009/0123683 A1‡ | 5/2009 | Miller | B32B 1/08 428/36.7 |
| 2011/0226375 A1‡ | 9/2011 | Harris | B32B 1/08 138/137 |

OTHER PUBLICATIONS

Colin W. Evans, "Hose Technology", Second Edition, Publisher: Applied Science Publishers Ltd, 2 pp.‡
Albert L. Moore, "Fluoroelastomers Handbook: The Definitive User's Guide and Databook", Nov. 2, 2005, Taylor & Francis; Elsevier 2006, p. 16 and p. 25.‡
Hydrogenated Nitrile Rubber, ttps://www.azom.com/article.aspx?ArticleID=537 by AZoM (AZoM).‡

‡ imported from a related application

CHEMICAL AND GAS-RESISTANT, HIGH-PRESSURE, LARGE-BORE BONDED FLEXIBLE RUBBER PIPE AND METHOD FOR PRODUCING THE SAME

This application is a continuation of U.S. patent application Ser. No. 15/297,629, filed Oct. 19, 2016, which claims the priority benefit of Hungarian Patent Application No. P1500493, the entire disclosures of which are incorporated herein by reference.

The invention relates to a high-pressure, large-bore bonded flexible rubber pipe resistant to aggressive chemicals and gases, with an inner liquid- and gas-tight layer (the so-called liner) of the pipe being made of poly(vinylidene-fluoride) homopolymer or copolymer (hereinafter: PVDF). The flexible pipe according to the invention is resistant to the effects of chemicals, for example zinc bromide solution and strong acids applied in oil well service, it is also gas decompression-resistant, and is capable of conveying gas and crude oil containing hydrogen-sulfide. From the aspect of this invention a flexible pipe is considered high-pressure in case its design pressure is at least 1.5 MPa. A flexible pipe is considered large-bore in case its internal diameter is larger than 25 mm (1"). In some cases flexible pipes are termed "hoses".

The invention also covers a production method of the above flexible pipe.

It is well-known that in the oil industry there is high demand for high-pressure, large-bore flexible pipes that are resistant to various aggressive chemicals (high-concentration strong acids, strongly corrosive gases such as hydrogen-sulfide or carbon dioxide). Such flexible pipes are among others applied for well handling, as choke and kill lines to prevent blowouts and for oil production. The generic structure of bonded flexible pipes is well-known, their requirements are described, by way of example, in the standards API Spec. 17K and API Spec. 16C by the American Petroleum Institute. In bonded flexible pipes, after vulcanization the liner, the rubberized textile layers, the rubber-embedded steel reinforcing plies and the rubber cover form a layered composite structure bonded together primarily by chemical bonding.

It is known that with high-pressure gaseous medium a significant amount of gas dissolves into the polymers, which may cause blistering or delamination during a pressure release event (i.e. decompression). With its excellent resistance to gas decompression, to hydrogen-sulfide and to chemicals, PVDF stands out from among plastic materials, and thus it is widely used as a liner material for so-called "unbonded" flexible pipes. Although a bonded flexible pipe with a PVDF liner is mentioned in the patent description GB 2,329,439 A, a practically applicable solution has not yet been marketed. One of the reasons for that is the difficulty to provide adhesion between the PVDF and the rubber material forming the other layers of the hose. In case of bonded pipes proper adhesion is important from the aspect of practical applicability, because if there is insufficient adhesion between the liner and the other layers then delamination will result in case of gas decompression, causing the pipe to fail quickly.

The range of rubber types applicable for such products is significantly limited by the requirement of hydrogen-sulfide resistance. It is known that hydrogenated nitrile butadiene rubber (commonly used abbreviation: HNBR) is highly resistant to conditions occurring in oil wells, i.e. to hydrogen sulfide and gaseous mediums, and therefore it is frequently applied as the material of seals and for other purposes in the oil industry.

A number of patent descriptions disclose solutions wherein a relatively soft vinylidene-fluoride-containing terpolymer called THV (terpolymer of tetrafluoroethylene, hexafluoropropylene and vinylidene-fluoride) is bonded to rubber. The document U.S. Pat. No. 5,679,425 discloses a low-diameter fuel hose wherein synthetic rubber is bonded to a THV liner having a thickness of a few tenths of millimeter applying cyanate, epoxy and other bonding materials. According to the description the vinylidene-fluoride content of the applied THV terpolymer is preferably 20%. The patent description EP 1,048,453 A2 also discloses a fuel hose comprising a thin (preferably 0.12-0.25-mm-thick) anti-diffusion layer made of THV. Rubber is bonded to THV applying organophosphonium salt.

However, these bonding systems are not effective with high-melting-point, strongly crystalline PVDF homopolymers and copolymers containing a low amount of comonomer in addition to vinylidene-fluoride. On the other hand, the tetrafluoroethylene, hexafluoropropene and vinylidene-fluoride terpolymer (THV) is not suitable for application in a gaseous medium because its resistance to gas decompression is much worse than the decompression resistance of poly(vinylidene-fluoride) (PVDF). We do not know of such solutions wherein poly(vinylidene-fluoride) would be bonded to a hydrogenated nitrile rubber-based rubber compound directly, without preliminary etching or applying an adhesion-promoter solution.

The patent specification EP 0 759 354 A1 discloses a rubber laminate wherein both layers are formed of rubber, where the inner layer is made of fluororubber containing—in addition to other monomers—vinylidene-fluoride, and where the outer layer may be made of hydrogenated nitrile rubber. Both layers of the laminate are vulcanized.

There are significant differences between fluororubber and PVDF in terms of both physical characteristics and structure. While fluororubber is soft already at room temperature, PVDF is a semi-crystalline plastic that softens only near its melting point. In fluororubbers the mole fraction of vinylidene-fluoride never reaches 80 mole %, (60% by mass) since at that value crystallization would occur. (A. L. Moore, *Fluoroelastomers Handbook.* p. 16 and p. 25 Elsevier 2006, and *Ullmann's Polymers and Plastics* Vol 2 p. 641, 2016).

The patent specification U.S. Pat. No. 5,876,624 A discloses an application of scorch-protected peroxides for the vulcanization of rubber laminates, and the patent EP 1 048 453 A2 discloses a hose made of vulcanized, hydrogenated nitrile butadiene rubber-based rubber compound, applying a liner made of tetrafluoroethylene, hexafluoropropylene and vinylidene-fluoride.

However, none of the above referenced solutions deals with the issues related to developing bonded high-pressure, large-bore flexible pipes described above.

The objective of the solution according to the invention is therefore to design and produce a bonded high-pressure, large-bore flexible pipe that comprises a PVDF homopolymer or PVDF copolymer liner (where the copolymer contains only a low amount of comonomer in addition to vinylidene-fluoride), and the liner is bonded to a hydrogen sulfide-resistant, hydrogenated nitrile butadiene rubber- (HNBR-) based rubber compound without etching or a treatment with adhesion-enhancing solution of the liner.

The flexible pipe according to the invention is, therefore, resistant to the effects of chemicals, such as the strong acids (formic acid, acetic acid, hydrochloric acid, hydrogen fluoride) applied for treating oil wells and also to the effects of zinc bromide solution. Zinc bromide chemically attacks hydrogenated nitrile butadiene rubber (HNBR), and thus the application of flexible pipes having a HNBR liner is severely restricted with zinc bromide. However, in the flexible pipe according to the invention the conveyed medium does not come in contact with HNBR, and thus it is capable of carrying zinc bromide solution.

Besides that, hoses with a PVDF liner, when applied by way of example for well testing or for oil extraction applications, have much longer service life compared for example to widely applied hoses comprising polyamide 11 liners. In this latter case, depending on the pH of the medium, the service life of the hose is limited at high temperatures due to the hydrolysis of amide bonds in polyamide 11.

In addition to the above, thanks to the characteristics of the liner, flexible pipes with a PVDF liner are also gas decompression-resistant.

The object of the invention is therefore a high-pressure, large-bore flexible rubber pipe, particularly for conveying gas or crude oil containing medium, comprising a liner made of poly(vinylidene-fluoride) homopolymer or copolymer, with at least 80 mole %, preferably at least 90 mole %, and expediently at least 95 mole % of the monomeric units being vinylidene-fluoride, and optionally comprising maximum 20 mole % of plasticizer, characterized in that a hydrogenated nitrile rubber-based rubber compound, vulcanized with peroxide, which has a Mooney 05, 150° C. scorch time of at least 10 minutes is bonded to the poly(vinylidene-fluoride) liner. The melting point of the PVDF liner is preferably above 150° C., more preferably above 160° C., expediently above 165° C.

We have recognised that appropriate bonding can be achieved if the vulcanization temperature is higher than the temperature usually applied for producing high-pressure hoses, i.e. it is at least 160° C., and in case of that the HNBR-based rubber compound is vulcanized applying peroxide. Accordingly, the method according to the invention is characterized in that vulcanization is performed at a temperature of at least 160° C. Appropriate bonding is achieved if the so-called Mooney scorch time of the compound, measured at 150° C. according to the ISO 289 standard (Mooney 05, 150° C.) is at least 10 minutes. Preferably, such a peroxide is applied that has a half-life (ti/2) of at least 1 hour at 150° C. Another alternative may be to apply a so-called scorch-protected peroxide.

In our opinion, the high degree of adhesion that is produced can be explained by that PVDF already softens to a significant extent near its melting point, and with the relatively slow vulcanization process there is sufficient time to develop strong bonding.

Vulcanization temperature is preferably selected such that it is in a range of +/−10° C. around the melting range of PVDF. Expediently, the vulcanization temperature differs by at most +/−5° C. from the melting range of PVDF.

One of the preferably applicable peroxide types is 2,5-dimethyl-2,5-di(t-butylperoxy)-3-hexyne, by way of example the product manufactured by Akzo-Nobel and marketed with the commercial name Trigonox 145, which according to the manufacturer's data has a half-life of 1 hour at 154° C. (i.e. more than 1 hour at 150° C.). Other preferably applicable types are 3,3,5,7,7-pentamethyl-1,2,4-trioxepane, for example the type marketed by Akzo-Nobel with the commercial name Trigonox 311, which according to the manufacturer's data has a half-life of 1 hour at 184° C. (i.e. more than 1 hour at 150° C.), or di-tert-butyl peroxide, for example the type marketed by Akzo-Nobel with the commercial name Trigonox B, which according to the manufacturer's data has a half-life of 1 hour at 151° C. (i.e. more than 1 hour at 150° C.). Other compounds that are less preferred but can also be applied are, by way example, organic hydroperoxides such as cumene hydroperoxide, which has a half-life of 1 hour at 188° C. according to the manufacturer's data, diisopropylbenzene hydroperoxide, having a half-life of 1 hour at 182° C. according to the manufacturer's data, t-butyl hydroperoxide, which has a half-life of 1 hour at 201° C. according to the manufacturer's data, or t-amyl hydroperoxide, which has a half-life of 1 hour at 183° C. according to the manufacturer's data. An example of the so-called scorch-protected peroxides is manufactured by Arkema and marketed with the commercial names Luperox F40P-SP and F40P-SP2. The peroxide active substance is di(tert-butylperoxy isopropyl)benzene, which has a half-life (ti/2) of 1 hour at 140° C., but due to the scorch-protection it can be ensured that the Mooney 05, 150° C. scorch time at 150° C. in the HNBR rubber compound is more than 10 minutes.

Obviously vulcanization can also be performed applying an arbitrary-proportion mixture of peroxides. The active substance content of the applied peroxide is usually lower than 100%, with the quantity thereof preferably being 3-12 mass fractions (for 100 mass fractions of rubber), or 2-6 mass fractions as calculated for the active substance.

The acrylonitrile content of the applied HNBR is preferably 15-50%, expediently 30-40%, with the residual double bond content being 0-10%. In addition to the peroxide, the HNBR-based rubber compound may contain further known and conventionally applied additives, such as fillers, metal oxides, plasticizers, so-called coagents for facilitating cross-linking, anti-aging agents, processing aids and the like. The HNBR-based rubber compound may preferably comprise (as calculated for 100 mass fractions of rubber) 20-100 mass fractions of rubber-grade carbon blacks, by way of example carbon blacks of the types N-339, N-550, N-772, and/or white filler, such as precipitated silicate, 0-10 mass fractions of metal oxide, by way of example magnesium oxide, 0-20 mass fractions of plasticizer, by way of example phthalate, adipate, sebacate or trimellitate esters of aliphatic alcohols, 0-10 mass fractions of coagent, by way of example triallyl isocyanurate, triallyl phosphate, triallyl trimellitate, diallylidene pentaerythrite, diallyl terephtalate, tetraallyl oxyethane, triallyl citrate, acetyl triallyl citrate, glycol methacrylate, 1,4-butanediol dimethacrylate, diethyelene glycol dimethacrylate, triethyelene glycol dimethacrylate, polyethylene glycol dimethacrylate, trimethylolpropane trimethacrylate and the like, 1-4 mass fractions of anti-aging agents, such as, by way example, phenylenediamine derivatives, and 0-6 mass fractions of processing aids.

The flexible pipe according to the invention therefore comprises a liner made of poly(vinylidene-fluoride) homopolymer, or of such copolymer wherein the proportion of vinylidene-fluoride monomer units is at least 80 mole %, the liner comprising maximum 20% by mass of plasticizer. The comonomer may, by way of example, be ethylene, tetrafluoroethylene, trifluorochloroethylene, hexafluoropropene, perfluoro vinyl ether, trifluoroethylene, 3,3,3-trifluoropropene, 2-hydro-pentafluoropropene. Such a hydrogenated nitrile rubber-based, peroxide vulcanized rubber compound is bonded to the liner of which the so-called Mooney scorch time, measured at 150° C. according to the ISO 289 standard (Mooney 05, 150° C.), is at least 10 minutes. Expediently, the half-life (ti/2) of the applied peroxide is at least 1 hour at 150° C., or the peroxide is scorch-protected. The internal diameter of the high-pressure, large-bore flexible pipe according to the invention is larger than 25 mm (1"), and its design pressure is at least 1.5 MPa. The thickness of the PVDF liner of the flexible pipe according to the invention is preferably at least 2 mm, expediently 5-12 mm. The flexible pipe according to the invention comprises at least two layers of rubber-embedded reinforcing plies, the plies being expediently laid in alternate senses. The number of the reinforcing plies can be even or odd, i.e. as many as 9-10 plies can be included in the flexible pipe according to the invention. The reinforcing plies are expediently made from steel cords, steel cables (strands) or steel wires, but may also be made from high-strength textile fibres, such as aramid, polyester, etc. The flexible pipe according to the invention may also contain an internal stripwound tube with an interlocking profile, a steel or other helix laid nearly perpendicularly to the axis of the flexible pipe, and stiffener rings. It may also comprise rubberized textile layers known per se, and may contain a rubber cover. It may be fitted with external armoring, such as an external stripwound, or a stainless steel outer helix. The flexible pipe according to the invention may be fitted with a known adhesively bonded or swaged coupling; the invention does not relate to the manner of coupling the flexible pipe.

For better comprehension, the invention will be described below with reference to the accompanying drawings, without, however, restricting the invention to the embodiments depicted.

Figure 1:
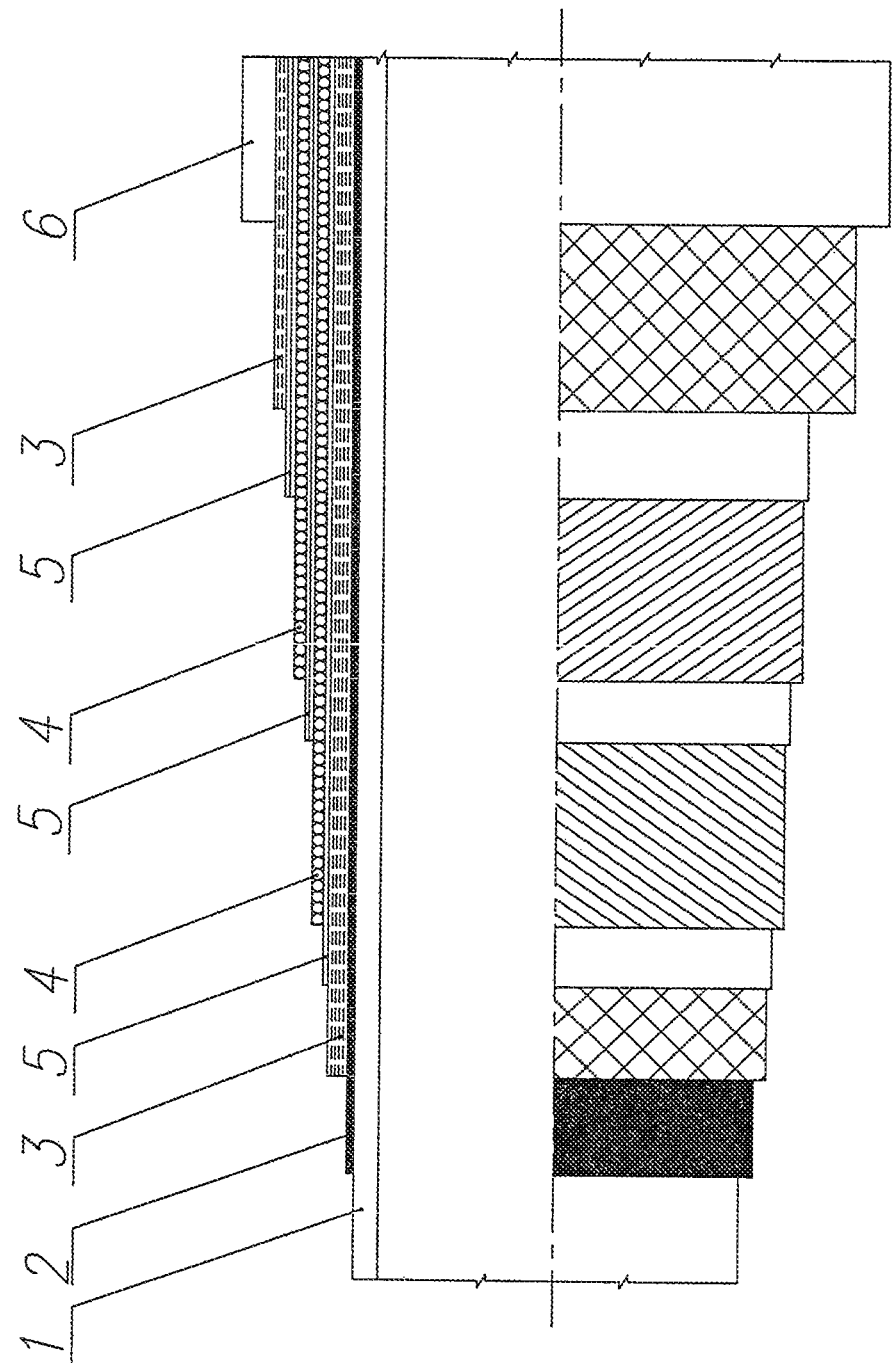
FIG. 1 shows a schematic view of a possible embodiment of the 2-ply flexible pipe according to the invention.

FIG. 1 therefore shows a conceivable embodiment of the smooth-bore flexible pipe (not including an internal stripwound tube) according to the invention that comprises two reinforcing plies. A layer of HNBR rubber compound 2 cross-linked with peroxide encompasses the PVDF liner 1. Going radially outwards from the longitudinal axis of the flexible pipe, there are situated four rubberized textile layers 3, with the two reinforcing plies 4 (made of steel strands) being encompassed by a wire embedding rubber layer 5. The reinforcing plies 4 made of steel strands are covered by two rubberized textile layers 3 and by a rubber cover 6.

Figure 2:
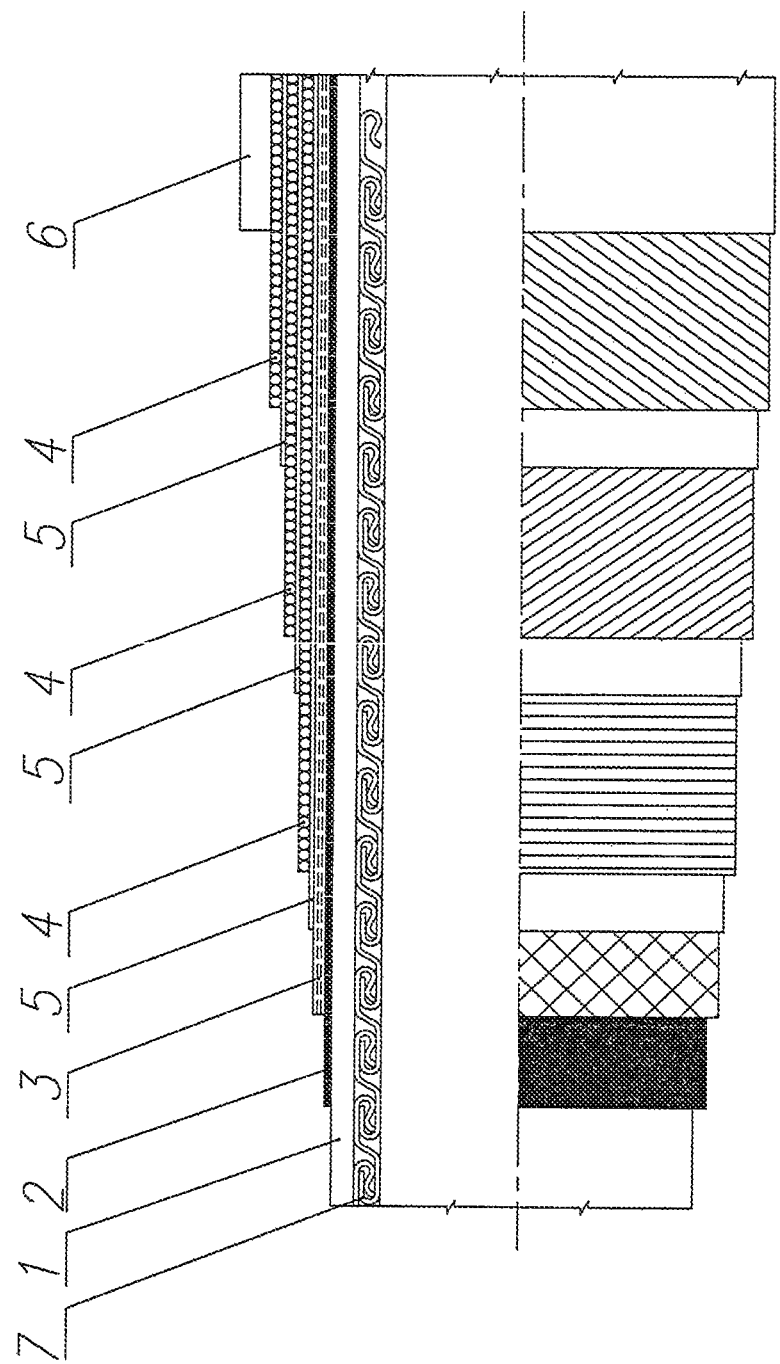
FIG. 2 shows a schematic view of a possible embodiment of the 3-ply flexible pipe according to the invention.

FIG. 2 depicts another conceivable embodiment of the flexible pipe according to the invention. The flexible pipe 7 is encompassed by a PVDF liner 1. Going radially outwards from the longitudinal axis of the hose, there is situated a layer of peroxide cross-linked HNBR-based rubber compound 2 joined to the PVDF liner 1, with two rubberized textile layers 3 being situated above them, and three steel strands reinforcing plies 4 being encompassed by a wire embedding rubber layer 5. The reinforcing plies 4 made of steel strands are covered by a rubber cover 6.

Figure 3:
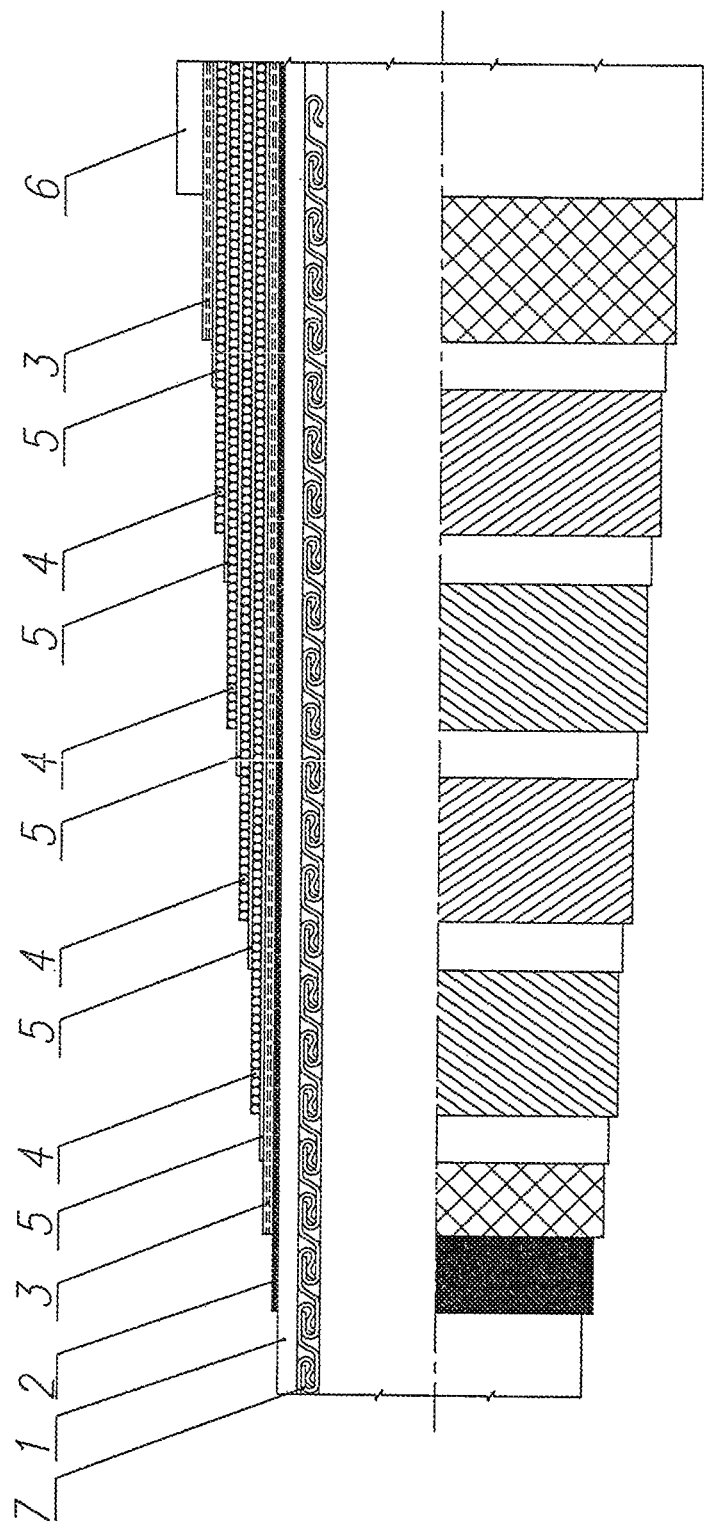
FIG. 3 shows a schematic view of a possible embodiment of the 4-ply flexible pipe according to the invention.

FIG. 3 illustrates yet another conceivable embodiment of the flexible pipe according to the invention. The flexible pipe 7 is encompassed by a PVDF liner 1. Going radially outwards from the longitudinal axis of the hose, there is situated a layer of peroxide cross-linked HNBR-based rubber compound 2 joined to the liner 1, with two rubberized textile layers 3 being situated above them, and four steel strands reinforcing plies 4 being encompassed by a wire embedding rubber layer 5. The reinforcing plies 4 made of steel strands are covered by two rubberized textile layers and by a rubber cover 6.

Figure 4:
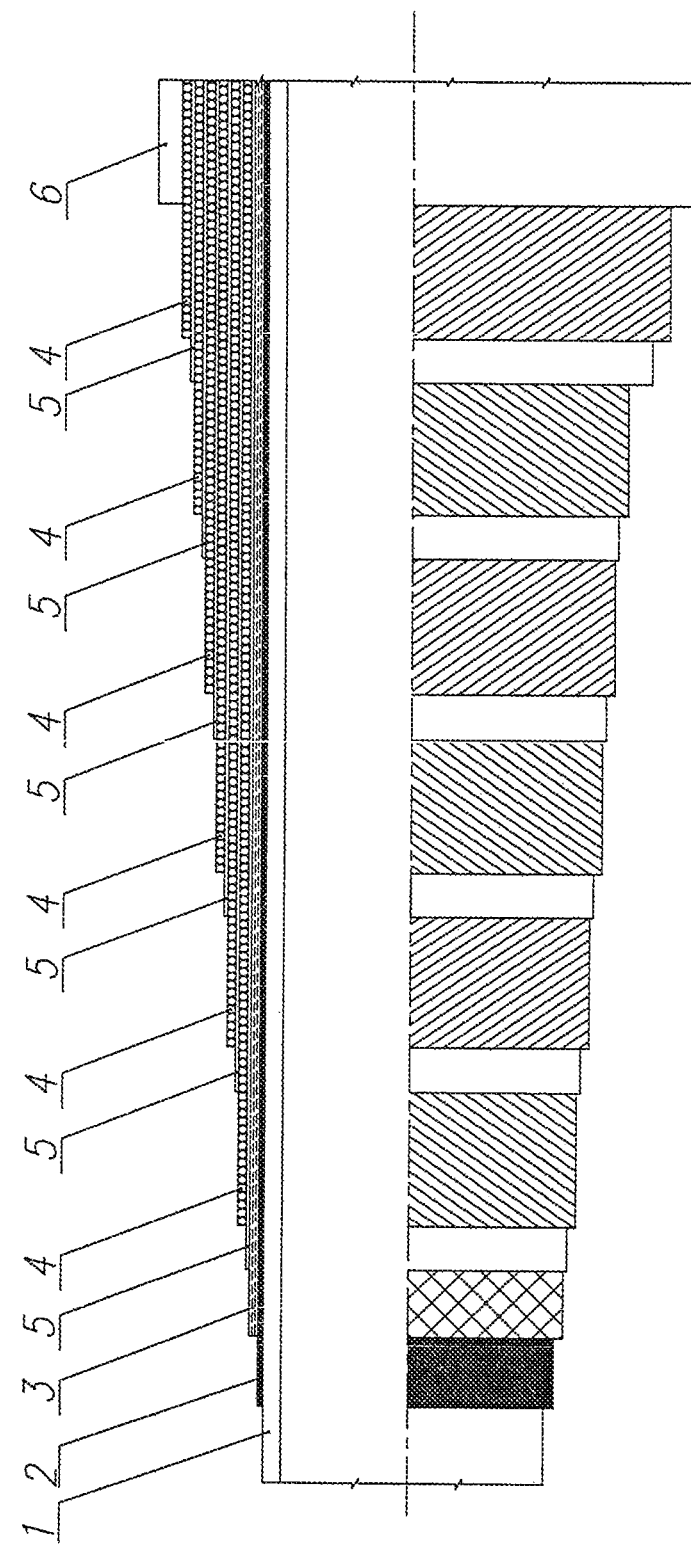
FIG. 4 shows a schematic view of a possible embodiment of the 6-ply flexible pipe according to the invention.

In FIG. 4 another conceivable embodiment of the smooth-bore flexible pipe (not including an internal stripwound tube) according to the invention is illustrated, comprising six reinforcing plies. A layer of HNBR rubber compound 2 cross-linked with peroxide encompasses the PVDF liner 1. Radially outwards from the axis of the flexible pipe there is situated a wire embedding rubber layer 5. Six layers of reinforcing plies 4 (made of steel strands) are encompassed by a wire embedding rubber layer 5. The reinforcing plies 4 made of steel strands are covered by a rubber cover 6.

The production method for manufacturing the flexible pipe according to the invention is illustrated by the following non-limiting example.

EXAMPLE 1

Manufacturing a Flexible Pipe with an Internal Diameter of 4" (102 mm) and an Operating Pressure of 69 MPa An interlocking-profile internal flexible stripwound tube 7, made of stainless steel, is situated inside the flexible pipe, which is encompassed by a PVDF liner 1 having a thickness of 6 mm. The liner 1 is made of PVDF copolymer that—in addition to vinylidene-fluoride ($VF_2$)—also contains a low amount of chlorotrifluoroethylene (CTFE). According to the manufacturer's data, its melting point is in the range of 170-174° C. A 1-mm-thick HNBR- (hydrogenated nitrile butadiene rubber) based rubber compound layer 2, with a Mooney 05, 150° C. scorch time of 12.0 minutes (according to the standard ISO 289) is bonded to the PVDF liner 1. For cross-linking, the HNBR-based rubber compound 2 was prepared with 8 phr (8 parts for 100 parts of elastomer by mass) of Trigonox 145 peroxide manufactured by Akzo-Nobel, the active agent being 2,5-dimethyl-2,5-di(t-butylperoxy)-3-hexyne, the active agent content and the half-life (ti/2) at 154° C. being 45% and 1 hour, respectively. The acrylonitrile content of the applied HNBR material is between 30% and 40%, with the residual double bond content being below 2%. The HNBR-based rubber compound 2 contained 70 phr of rubber-grade carbon blacks, 2.5 phr of triallyl isocyanate coagent, as well as a total of 18.7 phr of other additives (plasticizers, metal oxides, anti-aging agents, processing aids). The manufacturing of the flexible pipe was then continued in a conventional manner, by laying rubberized textile layers 3, a wire embedding rubber layer 5, and four steel strands reinforcing plies 4. Then, additional rubberized textile layers 3 and a rubber cover 6 were laid on the steel strands reinforcing plies 4. Finally, the flexible pipe was vulcanized at 175° C.

Upon dissecting the flexible pipe, adhesion between the PVDF liner 1 and the HNBR-based rubber layer 2 was examined. What was found was so-called "cohesive failure", implying that the PVDF remained covered with rubber over the entire surface, the adhesion value being above 10 N/mm measured according to the ISO 36 standard.

EXAMPLE 2 (COMPARATIVE EXAMPLE)

As with the previous example, a flexible pipe with an internal diameter of 4" (102 mm) was manufactured in a manner similar to the above example, applying the same materials, with the sole difference that the Mooney 05, 150° C. scorch time of the HNBR-based rubber compound 2 was 5.6 minutes according to the ISO 289 standard. The peroxide applied for cross-linking (also in 8 mass fractions for 100 mass fractions of elastomer) was Perkadox 1440 made by Akzo-Nobel that did not contain scorch-protection agent. The active substance of Perkadox 1440 was di(tert-butylperoxy isopropyl)benzene, the concentration of the active substance was 40%, with the half-life ($ti_{/2}$) at 140° C. being 1 hour (i.e. at 150° C. significantly less than 1 hour). This flexible pipe was vulcanized at a temperature of 155° C. Upon dissecting the flexible pipe, adhesion between the PVDF copolymer liner and the HNBR-based rubber layer was examined. A so-called "adhesive failure" was found; the rubber layer has come apart from the PVDF over the entire surface, with the adhesion value being as low as 3.1 N/mm measured according to the ISO 36 standard, less than one-third of the value measured with the solution according to the invention.

EXAMPLE 3

Manufacturing a Flexible Pipe with an Internal Diameter of 3" (76 mm) and an Operating Pressure of 103.5 MPa The pipe is a so-called smooth-bore one, with the PVDF liner being its innermost layer. The liner was made of PVDF copolymer containing hexafluoropropene in addition to vinylidene-fluoride ($VF_2$) and a low amount of plasticizer and having a melting point in the range of 166-170° C. A 1-mm-thick HNBR- (hydrogenated nitrile butadiene rubber) based rubber compound layer 2, with a Mooney 05, 150° C. scorch time of 14.0 minutes (according to the standard ISO 289) is bonded to the PVDF liner 1. For cross-linking, 7 phr of Luperox F40P-SP2 scorch-protected peroxide (with a di(tert-butylperoxy isopropyl)benzene active substance), made by Arkena, was added to the HNBR-based rubber compound 2. The composition of the applied HNBR-based rubber compound was different from the one specified in Examples 1 and 2 in that a different peroxide was applied for cross-linking. The manufacturing of the flexible pipe was then continued in a conventional manner, by laying rubberized textile layers 3, a cable embedding rubber layer 5, and six steel cable reinforcing plies 4. Then, additional rubberized textile layers 3 and a rubber cover 6 were laid on the steel cable reinforcing plies 4. Finally, the flexible pipe was vulcanized at 160° C.

Upon dissecting the flexible pipe, adhesion between the PVDF liner 1 and the HNBR-based rubber layer 2 was examined. What was found was so-called "cohesive failure", implying that the PVDF remained covered with rubber over the entire surface, the adhesion value being above 15 N/mm measured according to the ISO 36 standard.

The advantage of the flexible pipe according to the invention is, therefore, that it is resistant to the effects of chemicals, such as the strong acids (formic acid, acetic acid, hydrochloric acid, hydrofluoric acid) and zinc bromide solution that are applied for treating oil wells. Zinc bromide chemically attacks hydrogenated nitrile butadiene rubber (HNBR), and thus the application of flexible pipes having a HNBR liner is severely restricted with zinc bromide. However, in the flexible pipe according to the invention the conveyed medium, does not come in contact with HNBR, and thus the pipe is capable of carrying zinc bromide solution.

Hoses with a PVDF liner, when applied by way of example for well testing or for oil production applications, have much longer service life compared for example to hoses with polyamide 11 liner that are widely applied in the industry. In addition to that, thanks to the characteristics of the liner, flexible pipes with a PVDF liner are also gas decompression-resistant.

The above advantages can be provided without etching or a treatment with adhesion-promoter solutions in order to provide adhesion between the liner and the HNBR-based rubber compound.

ADDITIONAL EXAMPLE COMPRISING PVDF HOMOPOLYMER

A PVDF homopolymer sheet with a thickness of 1.7 mm was procured. The melting range of the applied PVDF material is 170-174° C. according to the manufacturer's data. Three 0.9-mm-thick layers of HNBR-based uncured rubber compound were laid on the PVDF sheet, together with two other 0.9-mm-thick layers of polychloroprene-based rubber compound. The HNBR compound had the same composition as the one presented in Example 1 of this specification. At a portion of both sides of the surface silicone paper separator sheet was applied between the HNBR and the PVDF. The laminate thus prepared was vulcanized at 175° C. for 40 minutes in an electrically heated press. Adhesion between the PVDF and HNBR inside the vulcanized laminate was above 20 N/mm as measured according to the ISO 36 standard.

What is claimed is:

1. A high-pressure, large-bore bonded flexible rubber pipe resistant to aggressive chemicals and gases, the flexible pipe comprising a liner made of poly(vinylidene-fluoride) homopolymer or copolymer, with at least 80 mole % of the monomeric units being vinylidene-fluoride for the copolymer and a hydrogenated nitrile rubber-based rubber compound vulcanized with peroxide, the compound having a Mooney 05, 150° C. scorch time of at least 10 minutes, and the compound directly bonded to the poly(vinylidene-fluoride) liner.

2. The flexible rubber pipe according to claim 1, wherein the melting point of the PVDF liner is above 150° C.

3. The flexible rubber pipe according to claim 1, wherein the hydrogenated nitrile rubber-based rubber compound is vulcanized with a peroxide having a half-life at 150° C. of at least 1 hour.

4. The flexible rubber pipe according to claim 3, wherein the hydrogenated nitrile rubber-based rubber compound is vulcanized with either one of 2,5-dimethyl-2,5-di(t-butylperoxy)-3-hexyne,3,3,5,7,7-pentamethyl-1,2,4-trioxepane, di-tert-butyl peroxide, or a combination thereof.

5. The flexible rubber pipe according to claim 1, wherein the peroxide applied for vulcanizing the hydrogenated nitrile rubber-based rubber compound is a so-called scorch-protected peroxide.

6. The flexible rubber pipe according to claim 5, wherein the hydrogenated nitrile rubber-based rubber compound is vulcanized with peroxide scorch-protected di(tert-butylperoxy isopropyl)benzene.

7. A method for manufacturing the flexible pipe according to claim 1, comprising vulcanizing at a temperature of at least 160° C.

8. The method according to claim 7 wherein the vulcanization temperature is selected such that it differs from the melting range of the poly(vinylidene-fluoride) liner by at most +/−10° C.

9. The method according to claim 8 wherein the vulcanization temperature is selected such that it differs from the melting range of the poly(vinylidene-fluoride) liner by at most +/−5° C.

\* \* \* \* \*